United States Patent
Levon

(10) Patent No.: US 8,454,222 B2
(45) Date of Patent: Jun. 4, 2013

(54) ILLUMINATION SYSTEM AND METHOD

(76) Inventor: Leif Levon, Alta (SE)

( * ) Notice: Subject to any disclaimer, the term of this patent is extended or adjusted under 35 U.S.C. 154(b) by 423 days.

(21) Appl. No.: 12/287,385

(22) Filed: Oct. 9, 2008

(65) Prior Publication Data

US 2010/0053952 A1    Mar. 4, 2010

(51) Int. Cl.
*F21V 7/0091* (2006.01)

(52) U.S. Cl.
USPC ........................ 362/628; 362/253; 362/806

(58) Field of Classification Search
USPC ............ 362/311.02, 311.06, 311.08, 311.1, 362/311.13, 806, 253, 602, 604, 605, 628; 40/427
See application file for complete search history.

(56) References Cited

U.S. PATENT DOCUMENTS

| | | | | |
|---|---|---|---|---|
| 1,499,688 A * | 7/1924 | Palmer et al. | | 362/602 |
| 2,359,559 A * | 10/1944 | Horky | | 40/427 |
| 5,003,437 A * | 3/1991 | Barrett | | 362/253 |
| 5,934,796 A * | 8/1999 | Quereau | | 362/806 |
| 6,135,601 A * | 10/2000 | Frucht | | 362/301 |
| 6,572,247 B2 * | 6/2003 | Liu | | 362/311.06 |
| 7,055,991 B2 * | 6/2006 | Lin | | 362/311.02 |
| 2004/0207997 A1 * | 10/2004 | Stewart et al. | | 362/31 |

FOREIGN PATENT DOCUMENTS

WO    WO 2007036829 A2 *    4/2007

* cited by examiner

*Primary Examiner* — Y My Quach Lee

(57) ABSTRACT

A system and a method are disclosed here for illumination of illumination of objects to produce visual displays. The object has internal transmissive surfaces and a proximal end and a tapering distal end, the proximal end has an aperture for receiving light, and the distal end terminates with at least one transmissive ornamental portion. The method comprises the step of providing at least one light source with a large surface area, reflecting the light rays, collecting the light rays at the distal end, and producing a visual ornamental display. The system comprises at least one light source, the light source is spaced apart from the proximal end, and at least one transmissive ornamental portion disposed at the distal end for collecting and focusing light to produce visual displays.

2 Claims, 16 Drawing Sheets

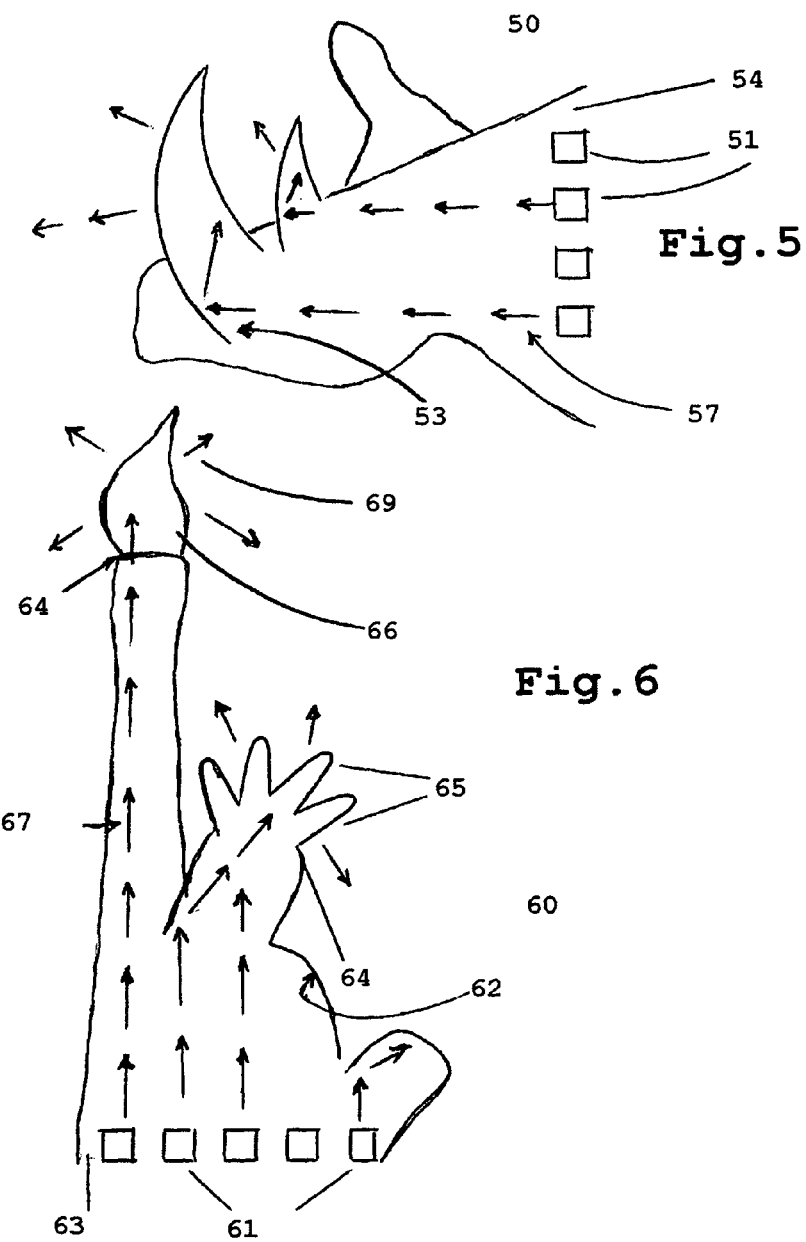

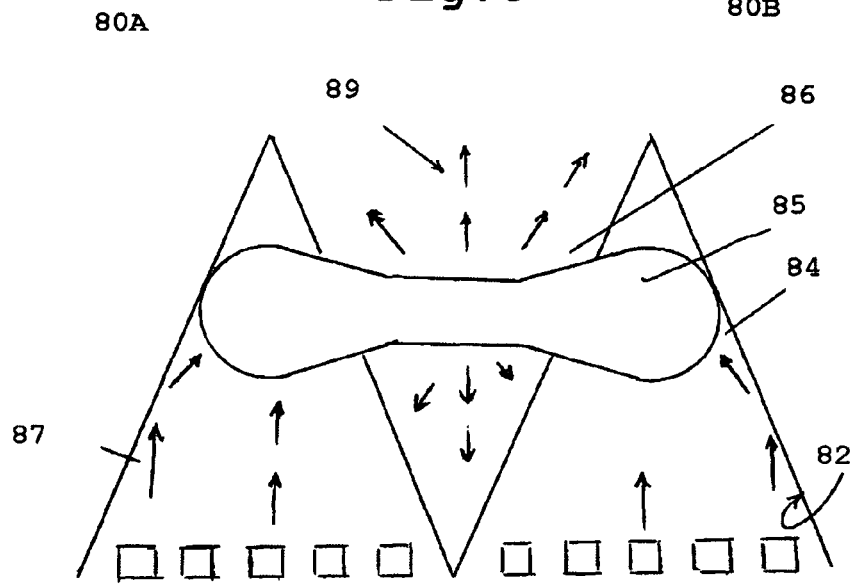
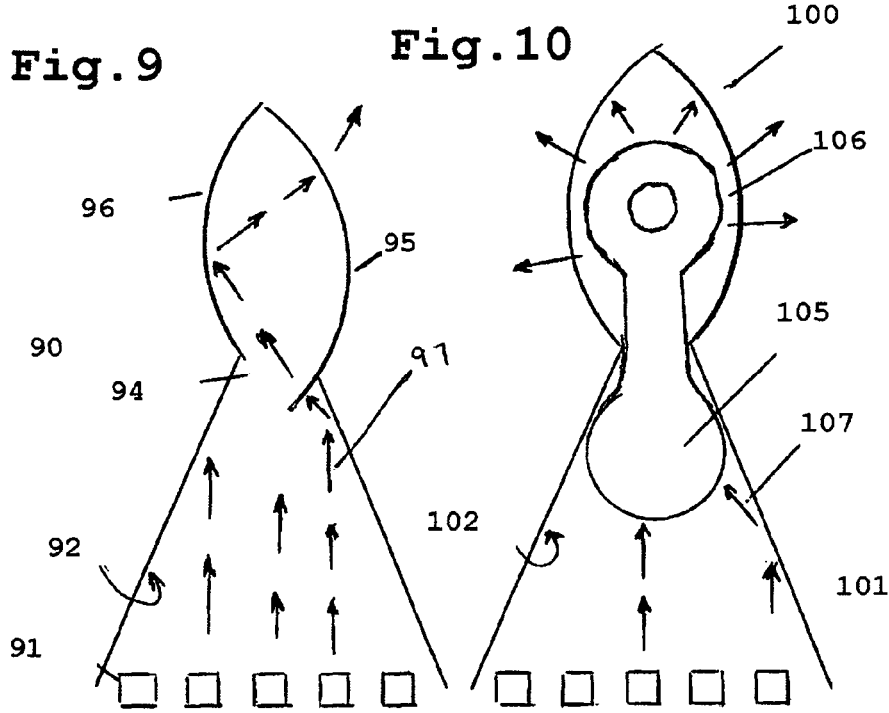

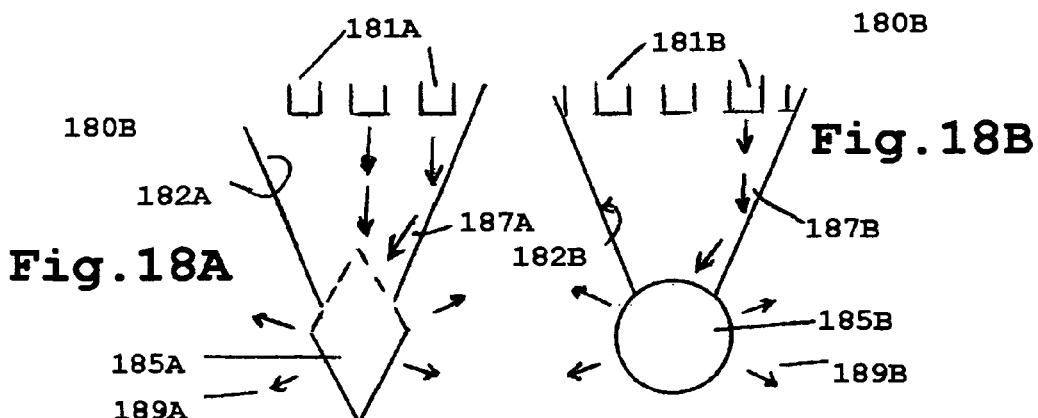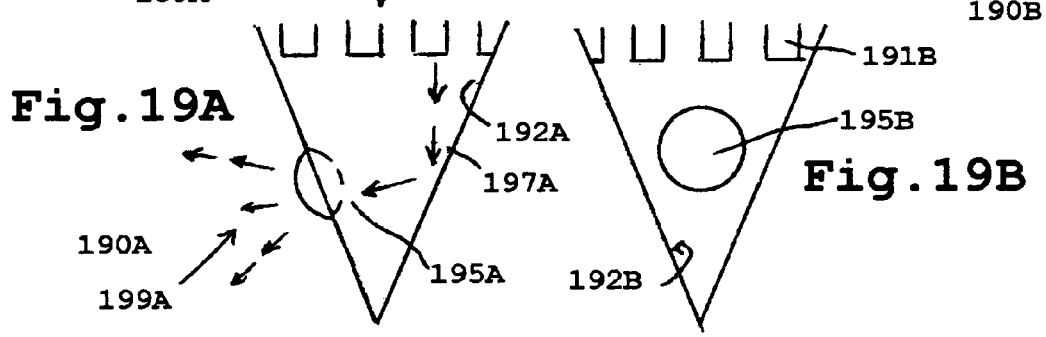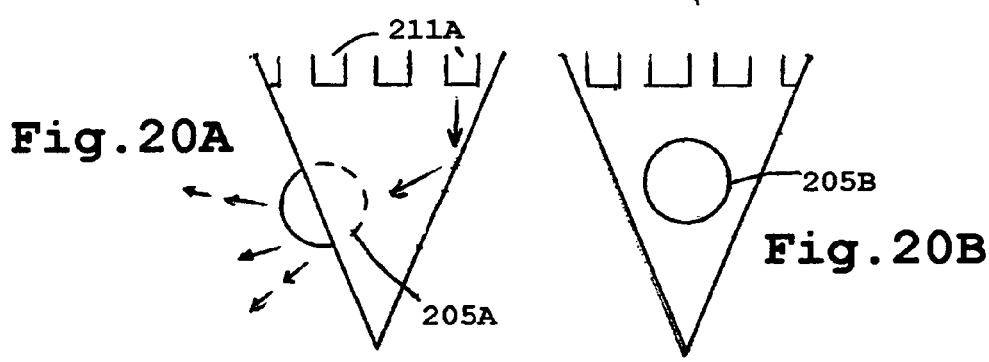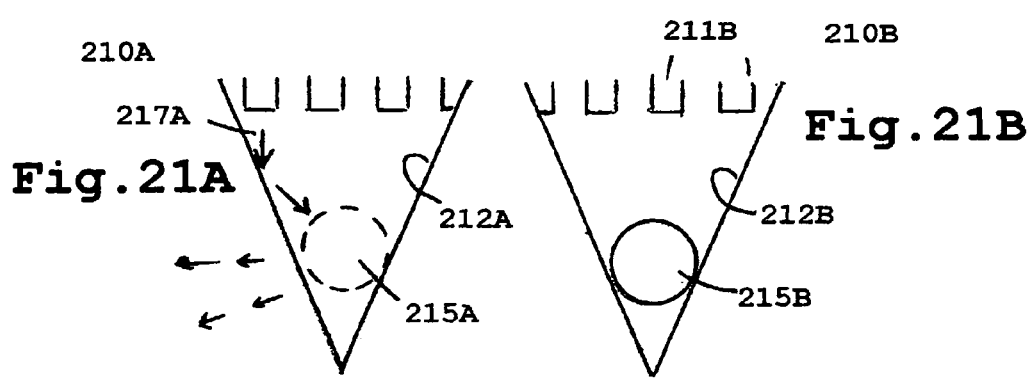

ILLUMINATION SYSTEM AND METHOD

CLAIM OF PRIORITY UNDER 35 U.S.C. 119

The present Application for patent claims priority, based upon the Paris Convention for the Protection of Industrial Property and the World Trade Organization, to UK Patent and Registration Office Application No. GB0802632 entitled Display Lamp Device filed on Feb. 14, 2008, which is hereby expressly incorporated by reference herein.

BACKGROUND

1. Field

This invention is generally related to an illumination system and method to produce visual displays.

2. Background of the Invention

The invention relates to a a system and a method for illumination of relatively small confined space using multiple sources to produce visual displays. Common systems use multiple external light sources to illuminate a confined space, or few light sources to provide internal illumination from below. One problem with this approach is that these external sources produce glare that reduces a viewer's ability to see objects in the field of view. Another problem is they provide a limited space for light sources due to the limited display area, and diode lamps are often exposed and visible. Another problem is that a large number of light sources are needed to illuminate the confined internal space.

Accordingly, a system and method for illumination of relatively small confined space to produce visual displays are needed to address these problems with the prior art systems.

SUMMARY OF THE INVENTION

The objects mentioned above, as well as other objects, are solved by the present invention, which overcomes disadvantages while providing new advantages not previously obtainable in the prior art.

In a preferred embodiment, a method is disclosed for illumination of an object that has internal transmissive surfaces and a proximal end and a distal end. The proximal end has an aperture for receiving light from light sources, and the distal end terminates with at least one transmissive ornamental portion. The method may include the steps of providing at least one light source, reflecting the light rays, collecting the light rays at the distal end, providing an ornamental transmissive portion at the end of the distal end to produce a visual ornamental display. The method guides light from relatively large surface area to a small surface area. All types of light rays, UV, florescent and others, may be used here to produce interesting visual displays.

The ornamental transmissive portion may include one or plurality of optical devices with perfect or approximate axial symmetry that transmits and refracts light converging, one or plurality of transmissive and generally pyramidal objects, a longitudinal frame, or a generally conical object, a plurality of connected lenses, a plurality of generally pyramidal objects.

Another embodiment may include a system for illumination of a hollow object that has internal transmissive surfaces, a proximal end, a distal end that terminates with one or plurality of ornamental transmissive portions.

The hollow object may be a pyramidal shape, an A frame shape or any desired shape.

The hollow object may have a cross sectional diameter that diminishes in size in a direction away from the light source.

The system may include one or plurality of hollow objects moving in a fluid or gaseous medium in response to changes in the system, such as temperature or pressure and so forth.

Other systems, methods, features, and advantages of the present invention will be, or will become, apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The novel features which are characteristic of the invention are set forth in the appended claims. The invention itself however, together with further objects and attendant advantages thereof, will be best understood by reference to the following description taken in connection with the accompanying drawings, in which:

FIG. 5 shows a side view of a display device illuminating rhinoceros horns.

FIG. 6 shows how to illuminate parts of a statue using the light guide system, for example spiked rays of a Nimbus/halo, torch flames and stone tablet.

FIG. 8 shows the combined use of two or more light guides acting together to illuminate a structure.

FIG. 9 shows a side view of a light emitting ornament composed of a reflector reflecting light onto a prismatic lens.

FIG. 10 shows a side view of a bulbous structure having a spherical or tuberous base placed in a light guide aperture with a sprouting portion extending into a reflector ornament resembling FIG. 10.

FIGS. 18a and 18b show cross sections of display lamps fitted with prisms and spherical lenses respectively.

FIG. 19a is a side view and FIG. 19b a front view of a lamp displaying an oval lens along one of its walls.

FIG. 20a is a side view and FIG. 20b a front view of a device displaying a spherical lens.

FIG. 21a is a side view and FIG. 21b a front view showing a spherical lens lodged in a corner region.

The components in the drawings are not necessarily to scale, emphasis instead being placed upon clearly illustrating the principles of the present invention. In the drawings, like reference numerals designate corresponding parts throughout several views.

DETAILED DESCRIPTION

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
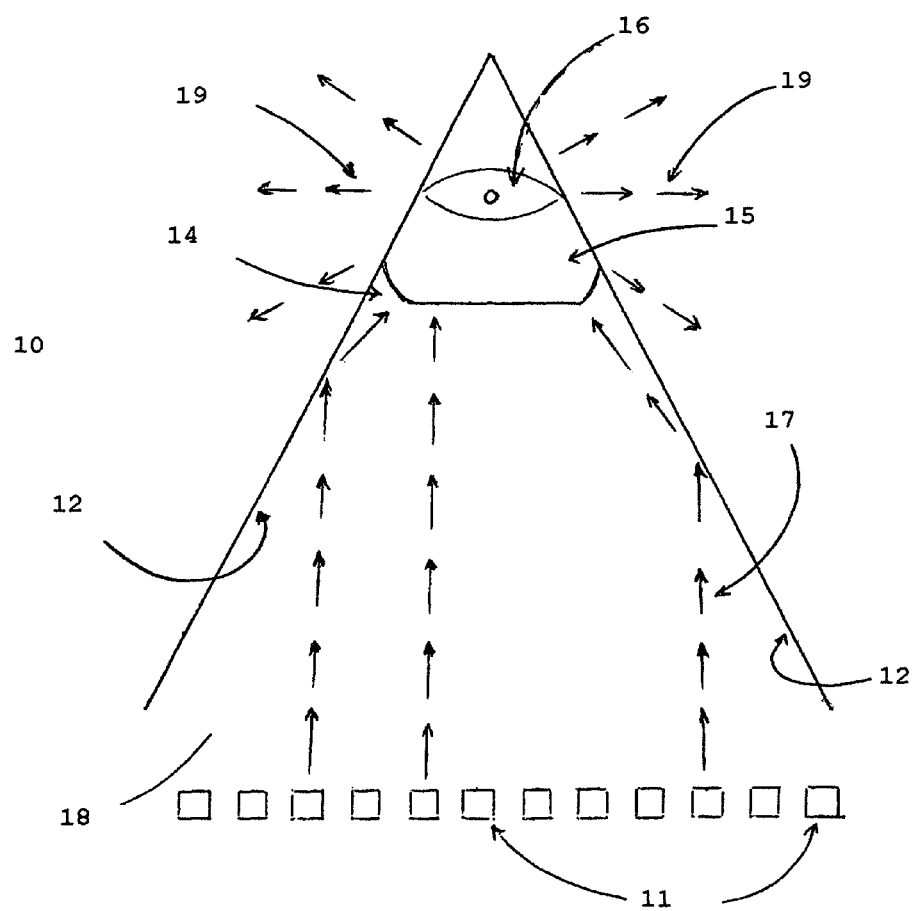
FIG. 1 shows a display device according to the invention housing multiple light sources.

FIG. 1 shows a display lamp 10 according to the invention. Several light sources 11 are positioned in or near aperture 18. Light rays 17 are collected and reflected onto adjacent and/or opposing interior walls 12 traveling toward aperture 14 to transcend into exhibited transmissive ornamental portion 15 enabling light rays 19 to be emitted from engraving 16.

Figure 2:
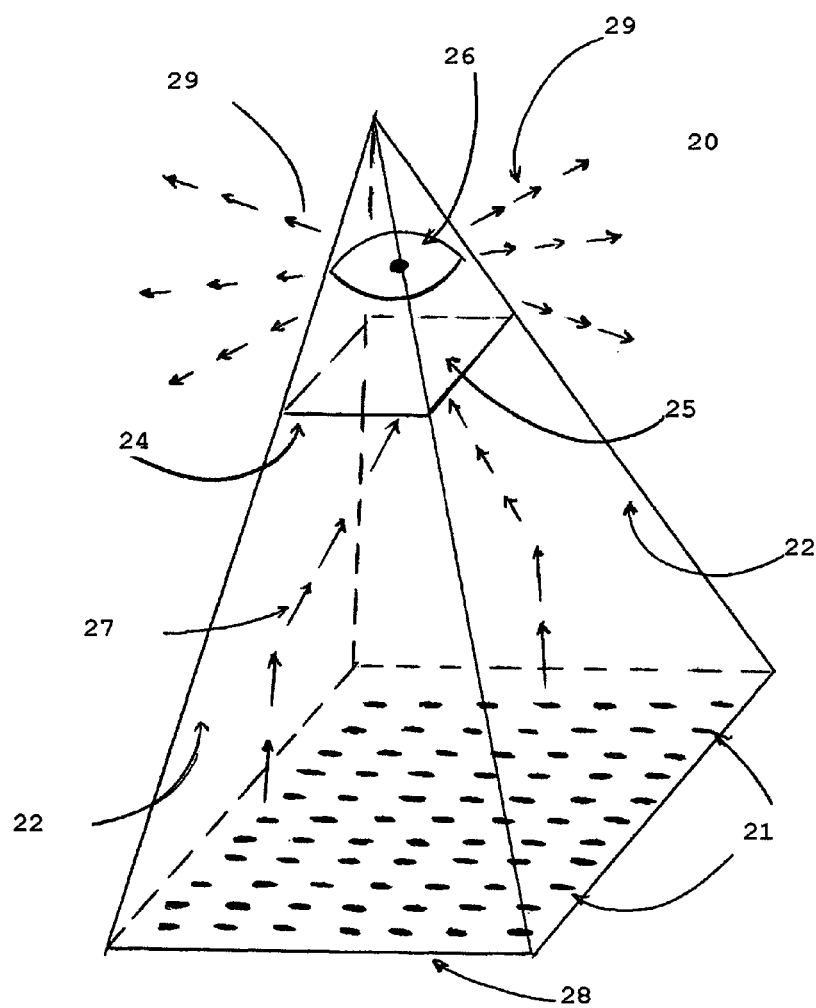
FIG. 2 illustrates a schematic perspective view of a display lamp in the shape of a pyramid, where the cap stone tip has been replaced by a smaller ornamental piece having light conducting and emitting properties.

FIG. 2 show a schematic view of a display lamp 20 having several light sources 21 in or near base aperture 28. Light rays 27 are internally reflected by means of the mirror like internal walls 22 and are concentrated toward aperture 24, where a transmissive ornamental portion cap stone pyramid 25 is lodged. Light rays 29 are further emitted from the ornamental portion 25 including its engraving 26.

Figure 3:
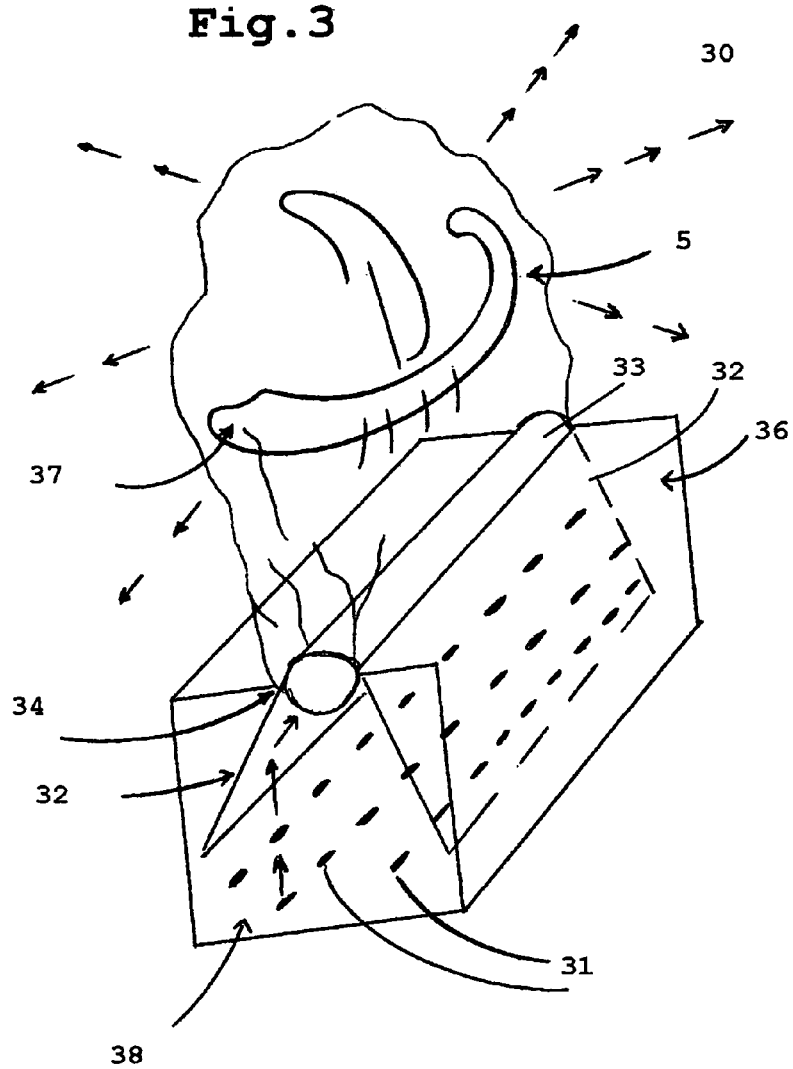
FIG. 3 depicts a schematic view of an ornamental display unit having elongated reflective surfaces facing one another resembling an A-frame.

FIG. 3 shows an elongated/oblong cone/ellipsoid/paraboloid or A-frame shaped display lamp 30, which may be oblong, elongated, cone, ellipsoid or paraboloid, with sloping wall surfaces extending from a large base aperture 38 converging toward a smaller elongated apical aperture 34, which may be housed within an attractive box 36. Light derived from light sources 31 are internally reflected between sides 32 to reach aperture 34 to illuminate transmissive ornamental portion 5 and engraving directly, or via a suitable lens 33, which may be positioned in aperture 34 to produce visual displays.

Figure 4:
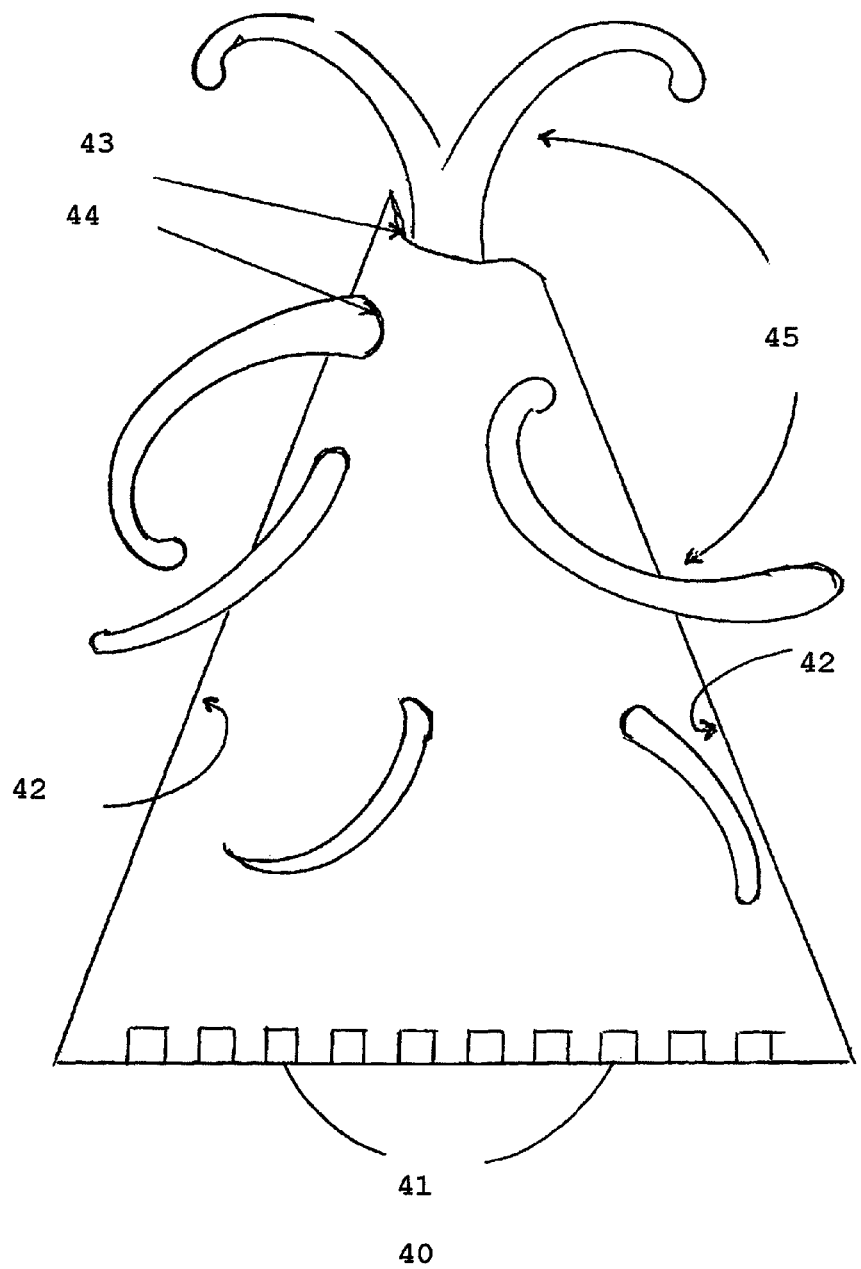
FIG. 4 shows a cone shaped display unit made to resemble an ornamental erupting volcano with spouting lava/magma made from light transmitting and emitting material.

FIG. 4 shows a conical display lamp 40 arranged to resemble an erupting volcano. Ejections in the form of light conducting and emitting material 45, have been fitted into apertures 44 made along the course of the structure as well as extending from the vortex aperture area 43. Walls 42 internally reflect light from diodes 41 to reach pierced by lava like material 45.

FIG. 5 shows an animal head display 50. Rays of light 57 emitted by light sources 51 are internally reflected to reach light transmissive ornamental portion 55 making them appear to glow as rays 51 radiate from them.

FIG. 6 shows a statue 60 having internal walls 62 coated with a mirror like amalgam materials to ensure efficient reflection of rays 67 from light diodes 61 to reach aperture 64 fitted with transmissive ornamental portion 65 to enable secondary light 69 to radiate out of its structure.

Figure 7:
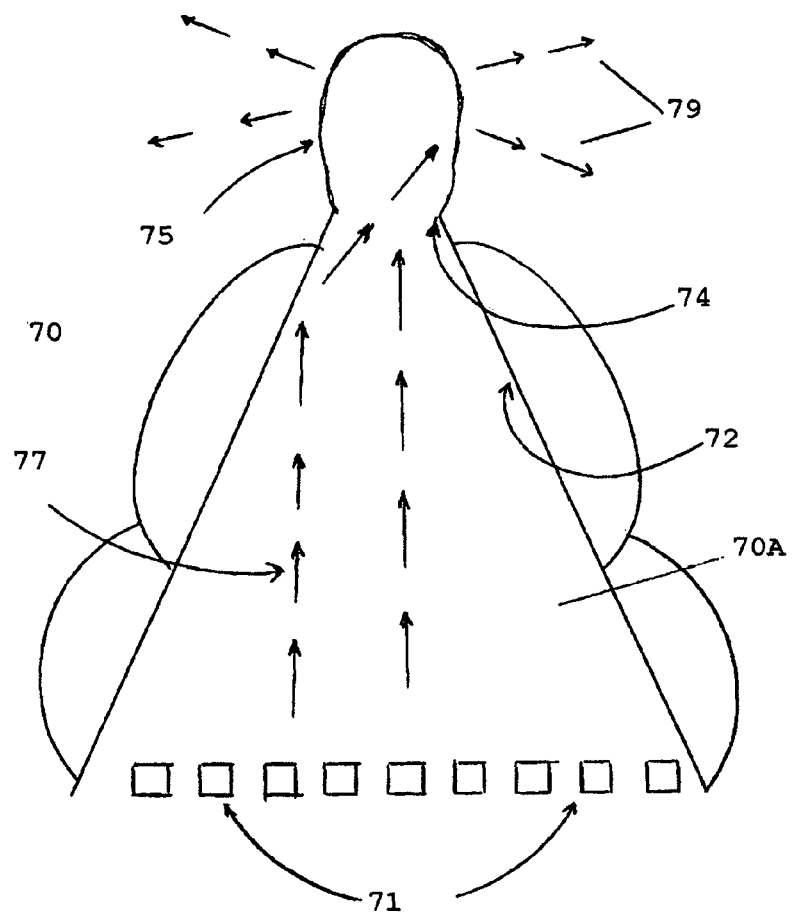
FIG. 7 shows the use of the display device to illuminate a head.

FIG. 7 shows a conical or pyramidal display 70A concealed inside a statue 70. Light rays 77 appear from diodes 71 and are guided towards a head structure 75 to create visible light rays 79.

FIG. 8 illustrates the combined use of two pyramidal displays 80A and 80B. Spheroidal lenses 85 are positioned in a corner area 84 and concentrated light is reflected through interconnecting rod 86.

FIG. 9 shows how light rays 97 are collected and internally reflected between opposite and/or adjacent internal surfaces 92 and reach external and partially internally mounted reflecting surfaces 91 to project light through opposing prismatic lens 95 dispersing light rays 99.

FIG. 10 shows a spheroidal lens 105 having a protruding end 106 extending into a prismatic like lens 100.

Figure 11:
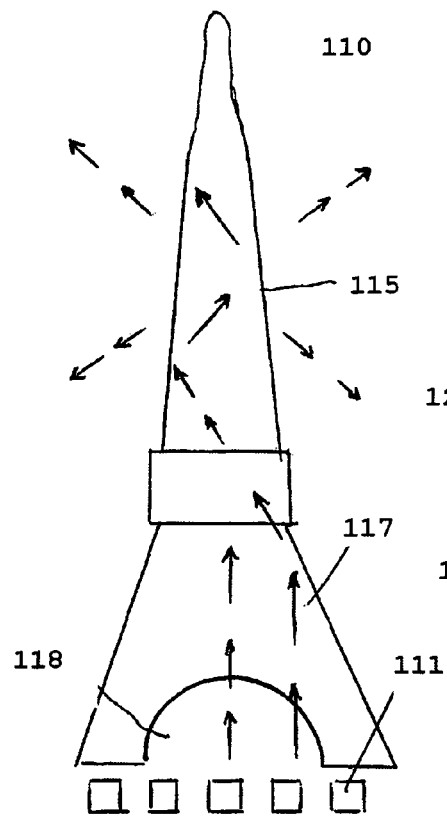
FIG. 11 illustrates a light guide system in the form of an obelisk or monument.

FIG. 11 shows a display 110 having a tapering monumental transmissive ornamental portion 115 indirectly illuminated by diodes 111 positioned in or near aperture 118. Light rays 117 are internally reflected to reach ornamental portion 115.

Figure 12:
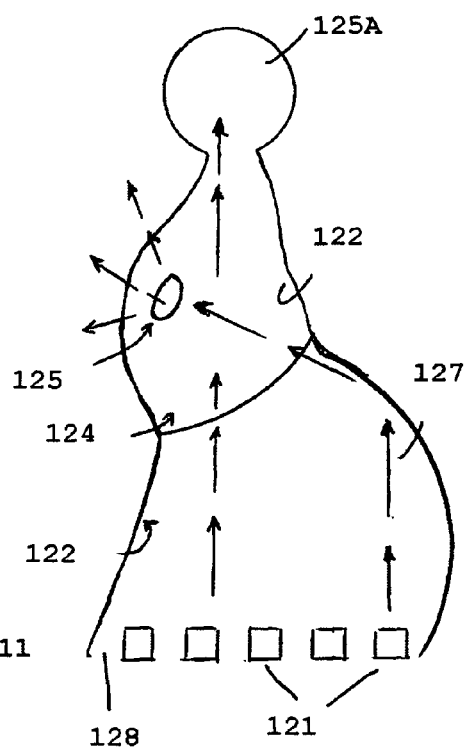
FIG. 12 shows a side view of an animal casting having areas illuminated using a light guide system.

FIG. 12 shows display 120 having light rays 127 reflected from aperture 128 along irregular reflective surfaces 1222 to reach apertures 124 along its course such as those housing transmissive ornamental portion 125 which in turn appears luminous.

Figure 13:
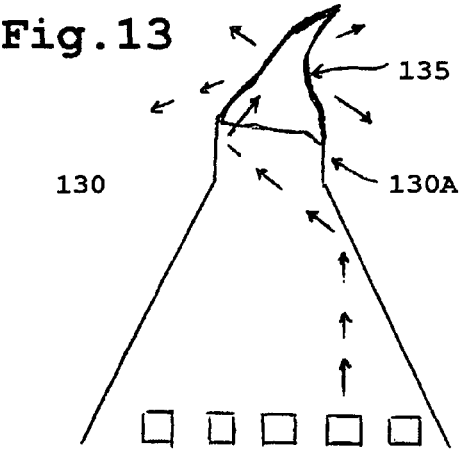
FIG. 13 shows a side view of a funnel shaped light guide fitted with a light emitting wick resembling a candle light.

FIG. 13 shows a funnel shaped light guide 130 connected to a light pipe 130A having transmissive ornamental portion 135 resembling a flame affixed to its end able to exhibit light.

Figure 14:
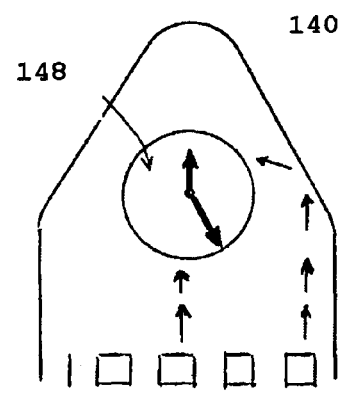
FIG. 14 shows a frontal view of an illuminated clock face.

FIG. 14 shows a light guide lamp display 140 in the shape of an inverted test tube. An aperture 148 having light emitting properties has been carved into the structure to resemble a time piece.

Figure 15:
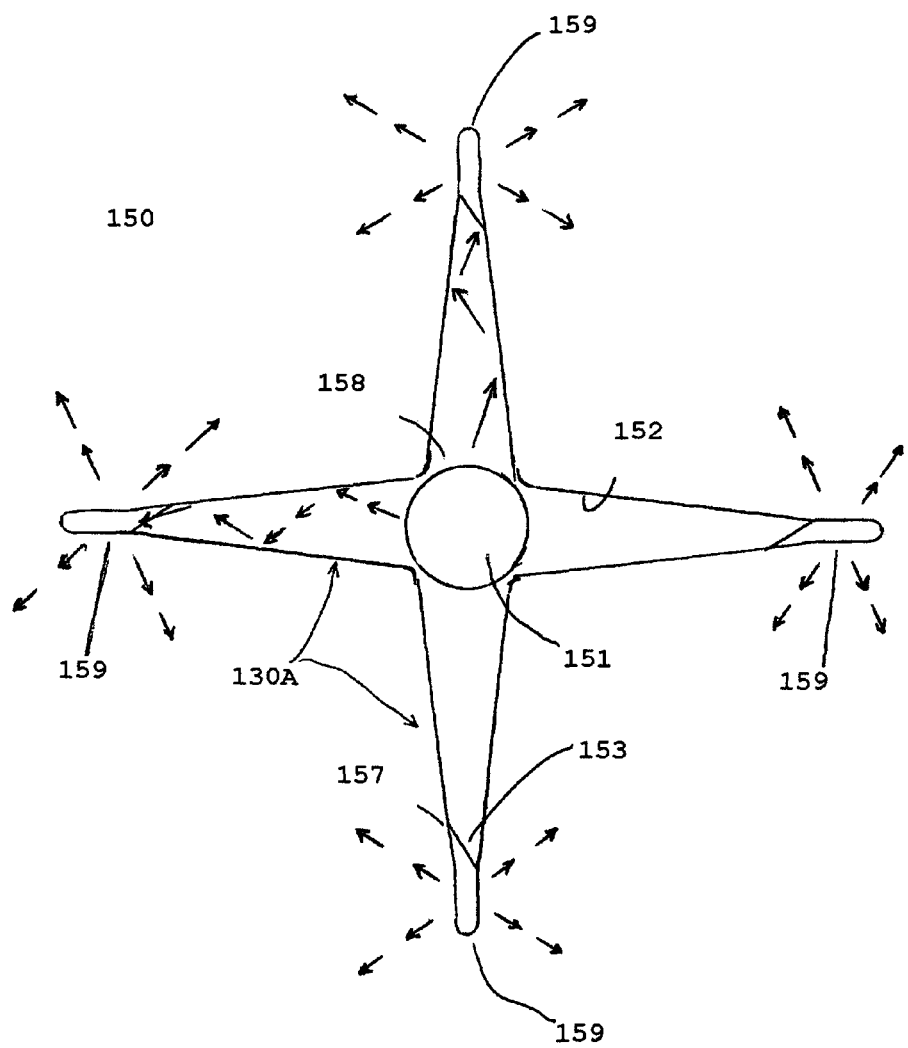
FIG. 15 shows a side view of several light guides arranged in star formation.

FIG. 15 shows the combined use of several pyramidal or cone shaped light guide units in the form of spines 150A configured to resemble a two or three dimensional star Christmas lamp 150. One or more light sources 151 may be positioned near or in their larger apertures 158. Reflective surfaces 152 have been removed distally and cut obliquely near their tips a portion of the internally reflecting walls to act as additional reflectors 157, brightening up the ornamental transmissive portion 159. Light is internally reflected at the ends and finally scattered resembling shining star rays.

Figure 16:
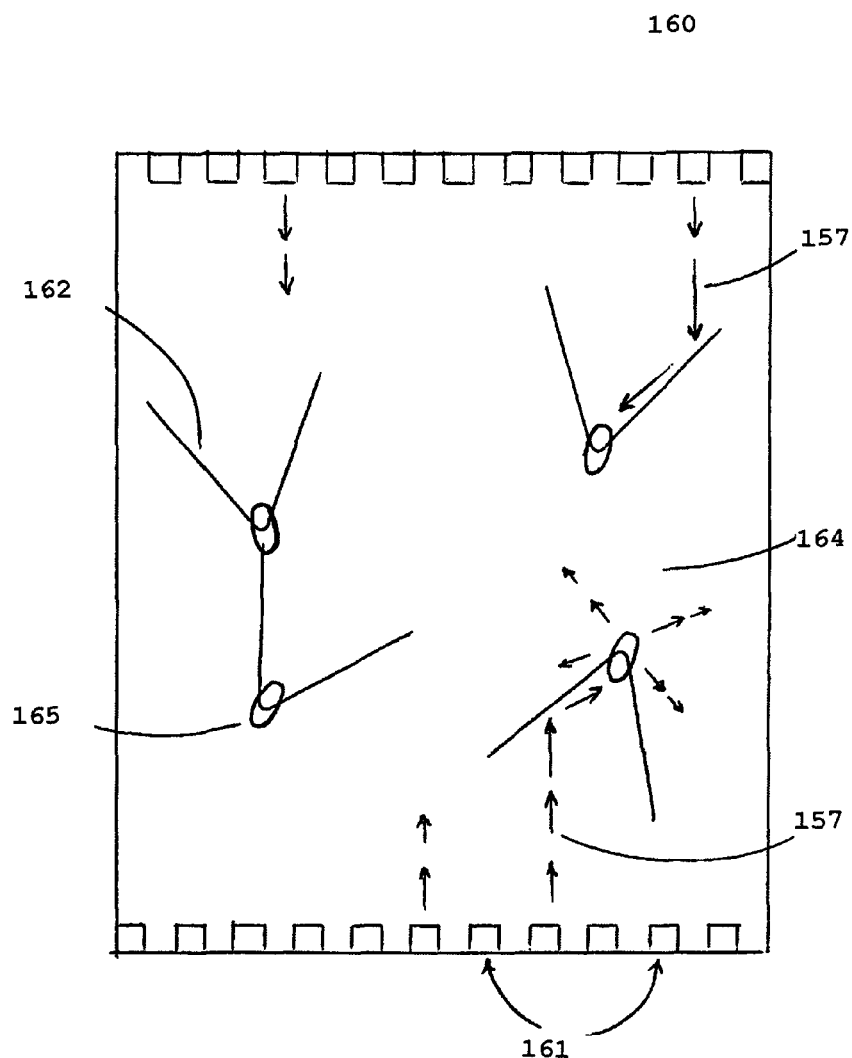
FIG. 16 shows a side view of light guides immersed in a liquid and capable of locomotion due to pressure changes, heat fluctuations or currents.

FIG. 16 shows several small display lamps immersed in a liquid or gas 164, contained in a receptacle 160, displaying motion due to pressure changes, temperature differences or variations caused by electrical/fluid currents. For example, transmissive ornamental portions 165 may be made of buoyant material as well as having light emitting properties and simultaneously operate as swim bladders, reacting to environmental differences, such as rising toward the surface when the pressure drops and falling toward the bottom when the pressure increases. If there is a rise in temperature they may ascend and vice versa when reaching cooler areas they start to descend. Ornamental transmissive portions 165 shine constantly as they receive light rays 157 from surrounding diodes 161, which are internally reflected between mirror like surfaces 162.

Figure 17A:
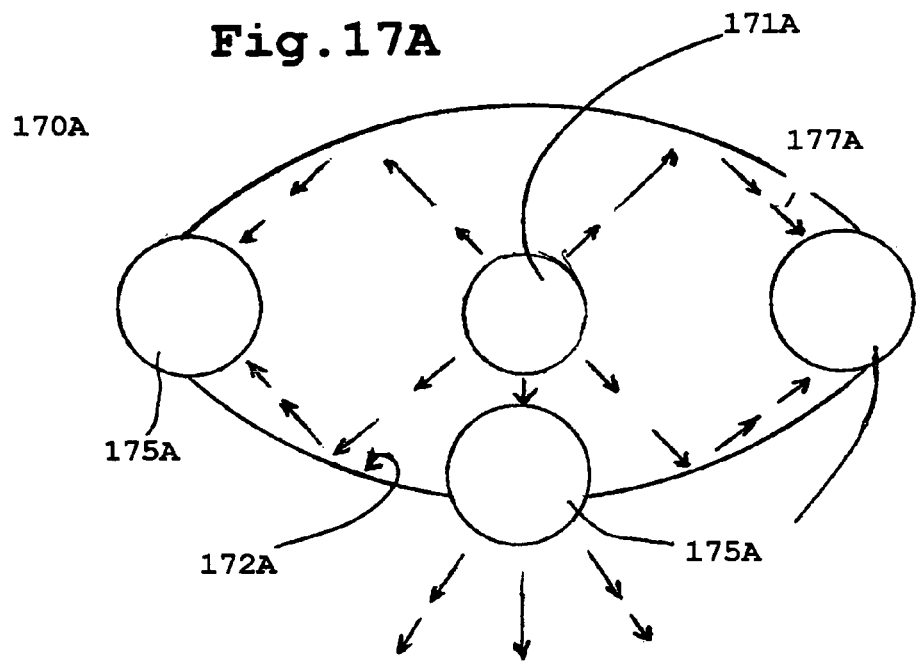
FIG. 17a shows a cross-section of parabolic/concave reflective surfaces distributing light throughout its structure.

FIG. 17a shows a display 170A having a cross sectional side view of parabolic or concave mirror like surfaces 172A facing one another, distributing rays from light source 171A to transmissive portion 175A positioned along their edges and body.

Figure 17B:
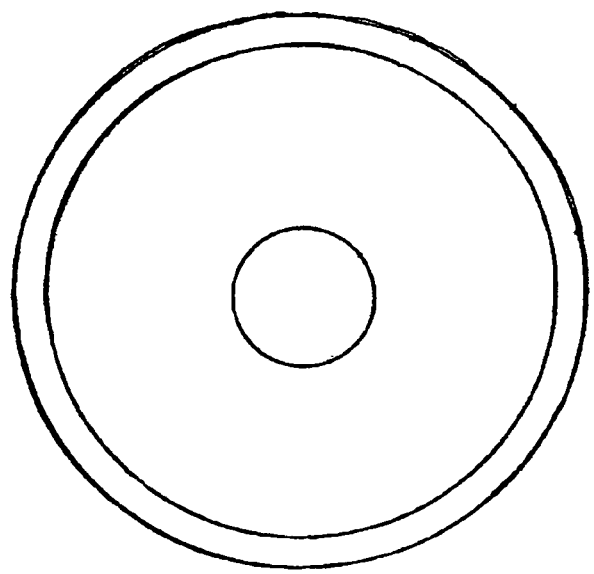
FIG. 17b shows FIG. 17a as seen from above.

FIG. 17b shows a cross sectional view of FIG. 17a as seen from above.

FIGS. 18a and 18b illustrates a prismatic lens and a spherical lens transmissive ornamental portions 185A and 185B respectively set atop a conical or pyramidal light 180A and 180B. Each ornament 185A and 185B are illuminated directly and indirectly by rays 187 from lights 181.

FIG. 19a shows a side view of a cone 190A and pyramid 190B with an ovoid lens transmissive ornament portion 195A and 195B placed between reflecting walls 192.

FIG. 20b shows a front view of FIG. 20a.

FIGS. 21a and 21b is similar to FIGS. 20a and 20b, except that transmissive ornamental portion ovoid body 205A and 205B have been replaced by spheroidal magnifying lenses 215A and 215B.

Figure 22A:
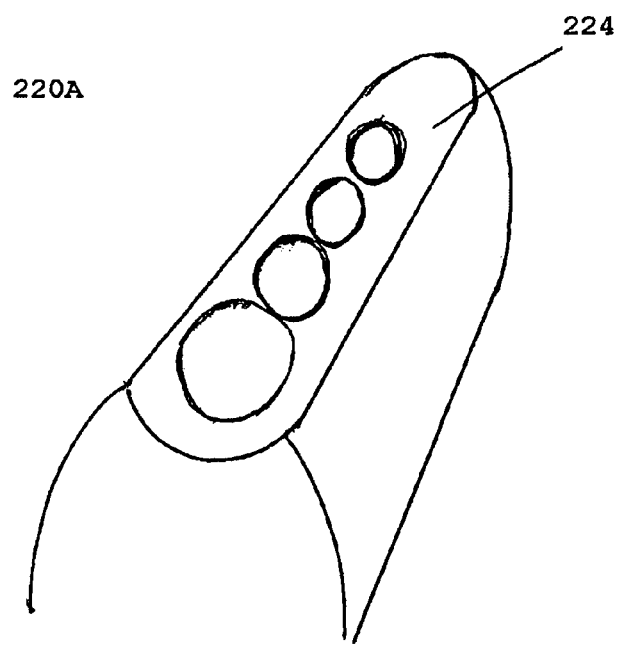
FIG. 22a illustrates a display lamp having conical/ellipsoidal/paraboloid/hyperboloid features or parts there of with lenses mounted in the window display area.

FIG. 22a shows a spherical magnifying lens 225 in a corner position 224 in the tapering end of a pyramid or cone.

Figure 22B:
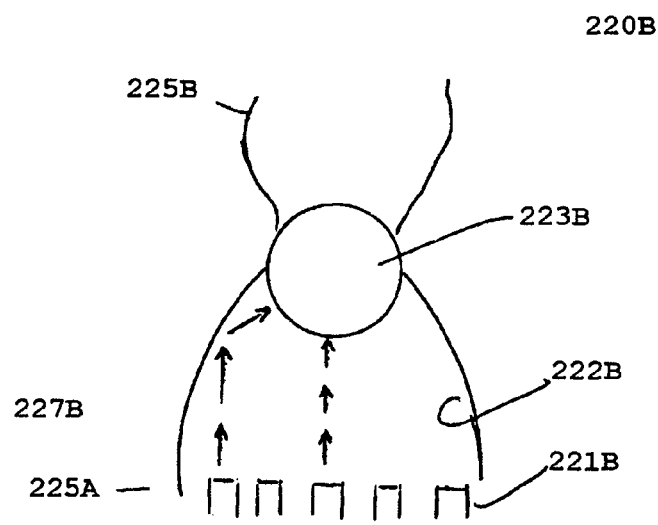
FIG. 22b depicts FIG. 22a in cross section.

FIG. 22B shows a transmissive portion 225A in the shape of a pyramid that terminates with a transmissive optical body 223B, which is attached to an upper open cone like transmissive body 225B.

Figure 23A:
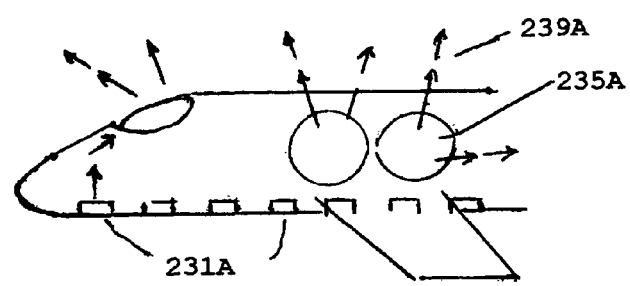
FIG. 23a,23b and 23c show the display device in the shape of vehicles.
Figure 23B:
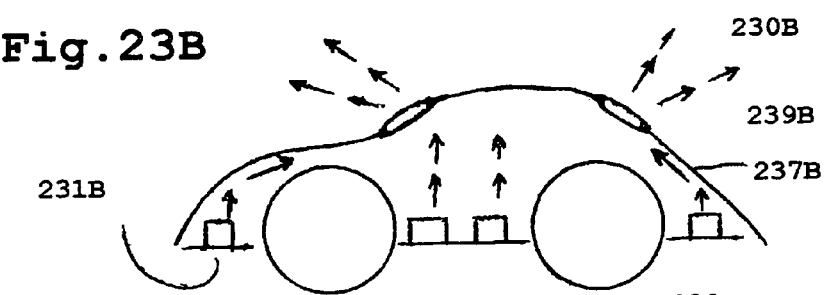
Figure 23C:
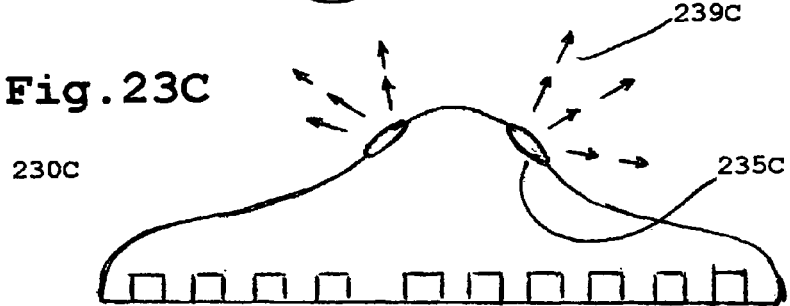

FIGS. 23a, 23b and 23c show examples of hollow structures 230A, 230B, 230C and 230D having internally reflecting walls collecting and distributing light rays to aperture windows having light emitting and spreading properties.

Figure 23D:
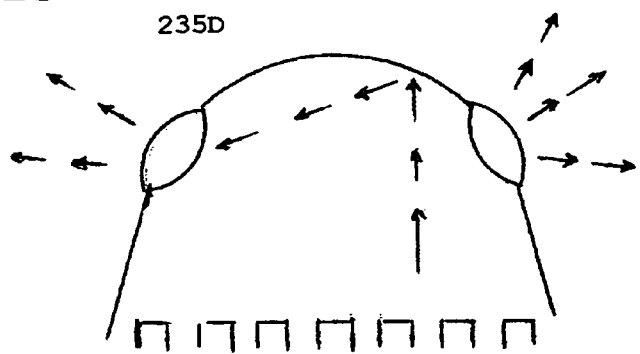
FIG. 23d shows a cross section of FIGS. 23a, 23b and 23c.

FIG. 23d shows a generalized cross sectional view of FIGS. 23a-23c, summarizing the internal conduction and distribution of light rays 237D as well as the external spread of light 237D from display windows 235D.

Figure 24A:
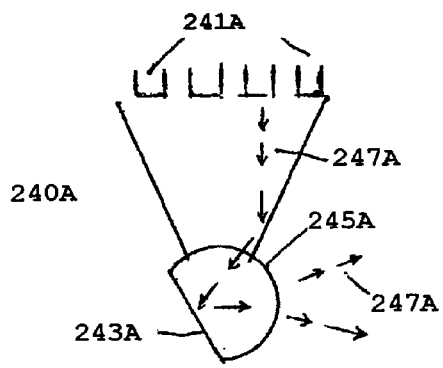
FIGS. 24a and 24b illustrate ornamental reflectors.

FIG. 24a shows a reflecting surface 240A placed on a section of a adjustable spheroidal lens 245A capable of altering the angle of reflection when tilted in various directions.

Figure 24B:
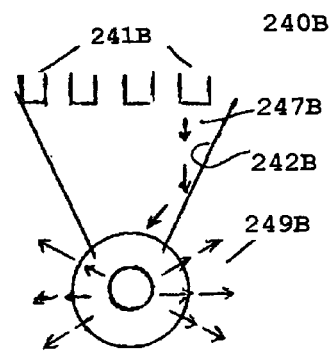

FIG. 24b shows a spheroidal reflecting surface 240B placed inside an ornamental transmissive portion 245B able to transmit light rays 249.

Figure 25A:
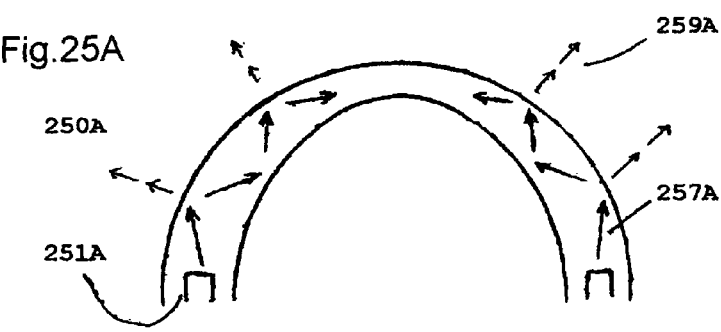
FIG. 25a shows a cross sectional view and FIG. 25b a schematic view of a display device having walls made of two way mirror material housing a reflective structure of predominantly similar shape.

FIG. 25a shows a cross sectional view of a display lamp 250A having internal and external surfaces 252 constructed of two way semi transparent and reflecting 251 mirrors, housing a reflecting structure of similar but smaller size, to permit internal reflection between their spaces of light rays 257 issuing from diodes 251, as well as allowing partial escape of light rays 259 along its course creating a multi-dimensional optic effect.

Figure 25B:
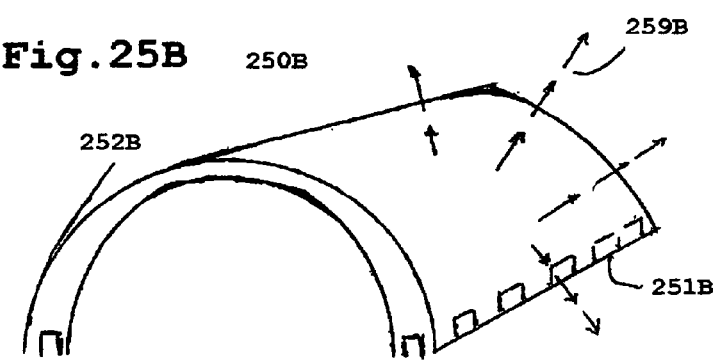

FIG. 25b shows a generalized overview of FIG. 25a.

Figure 26:
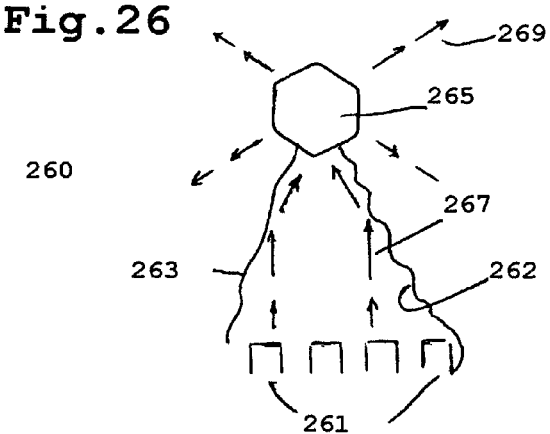
FIG. 26 shows an example of irregular reflective surfaces.

FIG. 26 illustrates the use of regular and irregular internal reflective surfaces to illuminate a gem stone or other ornament. Luminaries 261 are housed within cylindrical reflective surfaces 262 which in turn interconnect with uneven reflective surfaces 263 enabling rays 267 to transcend toward ornamental transmissive portion 265 transmitting light rays 269.

Figure 27:
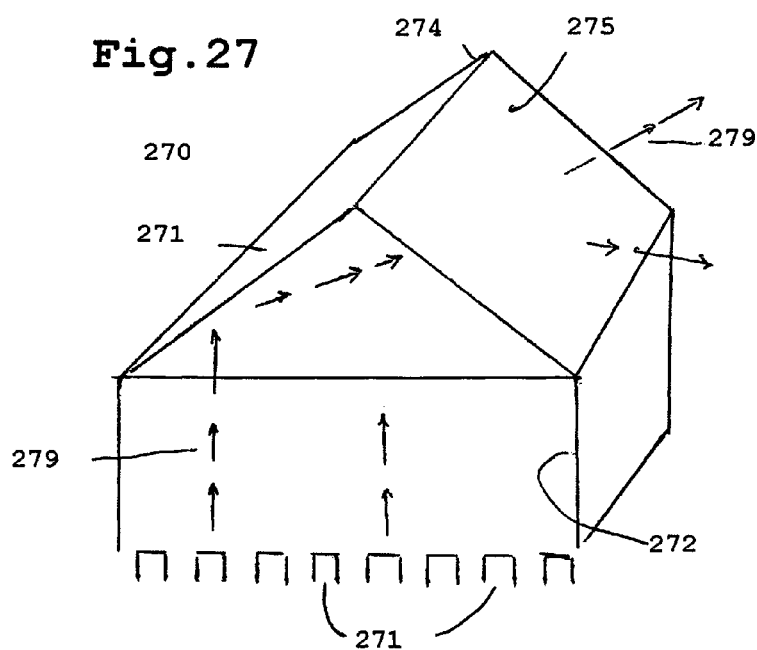
FIG. 27 shows a roof structure made of crushed reflecting material having one or more sides of silver material extending from the interior of the light guide wall acting as additional reflectors onto the light emitting roof coating.

FIG. 27 shows an example of light sources 271 surrounded by parallel internally reflecting walls 272, bearing a roof like ornamental transmissive portion 275 composed of reflecting or transmitting and light emitting material for example crushed glass or plastic, with part of the ceiling covered with a reflector 171 directing rays 279 toward the rest of the roof 274.

The ornamental transmissive surfaces are not limited to globular, conical, cylindrical, and other shapes, as will be apparent to those having ordinary skill in the art. These may be formed with a variety of internal and external reflective surfaces, and suitable light conductors, and may be made of a variety of materials.

The term transmissive includes transparent surfaces, semi-transparent surfaces, mirrors, two way mirrors, reflective surfaces, refractive surfaces, diffusive surfaces and absorptive surfaces.

The above description is not intended to limit the meaning of the words used in the following claim that define the invention. Persons of ordinary skill in the art will understand that a variety of other designs still falling within the scope of the following claims may be envisioned and used. It is contemplated that future modifications in structure, function, or result will exist that are not substantial changes and that all such insubstantial changes in what is claimed are intended to be covered by the claims.

I claim:

1. A display device providing internal illumination of decorative object comprising an internally reflecting pyramidal tapered light guide, wherein the light guide tapers from a base to an apical aperture end, the base comprises a base aperture and the apical aperture end defining a lodgment, at least one light source is positioned in or near the base aperture, the light source projects light towards the base aperture, opposing transmissive surfaces of the light guide extend from the base aperture onto a displayed transmissive refractive ornamental portion, the ornamental portion is positioned at the lodgment and tapered continously from the apical aperture end of the tapered light guide to an apex, opposing transmissive surfaces of the light guide concentrate light toward the apical aperture end of the light guide, concentrated light converges into the ornamental portion, and the converged concentrated light is emitted from the ornamental portion through engraving portion of the ornamental portion.

2. A display device providing internal illumination of decorative object comprising an internally reflecting pyramidal tapered light guide, wherein the light guide tapers from a base to an apical aperture end, the base comprises a base aperture and the apical aperture end defining a lodgment, at least one light source is positioned in or near the base aperture, the light source projects light towards the base aperture, opposing transmissive surfaces of the light guide extend from the base aperture onto a displayed ornamental portion, the ornamental portion comprises a reflector and a refracting lens positioned at the lodgement and tapered from the apical aperture end of the light guide to an apex, opposing transmissive surfaces of the light guide concentrate light toward the apical aperture end of the light guide, concentrated light converges into the ornamental portion, and the converged concentrated light is reflected by the reflector to the lens and emitted from the ornamental portion through the lens of the ornamental portion.

\* \* \* \* \*